United States Patent
Hopkins et al.

(10) Patent No.: US 8,401,184 B2
(45) Date of Patent: Mar. 19, 2013

(54) DEVICE TO GENERATE A MACHINE SPECIFIC IDENTIFICATION KEY

(75) Inventors: Andrew Hopkins, Colchester (GB); Klaus McDonald-Maier, Colchester (GB); Gareth Howells, Colchester (GB)

(73) Assignee: University of Essex Enterprises Limited, Colchester, Essex (GB)

( * ) Notice: Subject to any disclaimer, the term of this patent is extended or adjusted under 35 U.S.C. 154(b) by 456 days.

(21) Appl. No.: 12/376,234

(22) PCT Filed: Aug. 2, 2007

(86) PCT No.: PCT/GB2007/002916
§ 371 (c)(1),
(2), (4) Date: Nov. 20, 2009

(87) PCT Pub. No.: WO2008/015421
PCT Pub. Date: Feb. 7, 2008

(65) Prior Publication Data
US 2010/0119062 A1     May 13, 2010

(30) Foreign Application Priority Data
Aug. 3, 2006  (GB) .................................. 0615392.8

(51) Int. Cl.
| | |
|---|---|
| H04L 9/00 | (2006.01) |
| G06F 21/00 | (2006.01) |
| G06F 11/30 | (2006.01) |
| G06F 12/14 | (2006.01) |
| G06F 7/04 | (2006.01) |
| G06F 12/00 | (2006.01) |
| G06F 13/00 | (2006.01) |
| G06F 17/30 | (2006.01) |
| G11C 7/00 | (2006.01) |

(52) U.S. Cl. .......... 380/44; 380/277; 380/262; 380/264; 380/265; 713/189; 713/182; 726/17; 726/21

(58) Field of Classification Search ..................... 380/44
See application file for complete search history.

(56) References Cited

U.S. PATENT DOCUMENTS

| | | | | |
|---|---|---|---|---|
| 5,917,909 | A * | 6/1999 | Lamla .............................. 705/67 |
| 6,233,339 | B1 * | 5/2001 | Kawano et al. ................. 380/44 |
| 6,299,069 | B1 * | 10/2001 | Shona ........................... 235/492 |
| 6,363,210 | B1 * | 3/2002 | Owashi et al. ................ 386/259 |
| 6,480,959 | B1 * | 11/2002 | Granger et al. ............... 713/189 |
| 6,502,209 | B1 * | 12/2002 | Bengtsson et al. .............. 714/35 |
| 6,530,047 | B1 * | 3/2003 | Edwards et al. .............. 714/724 |
| 6,622,184 | B1 * | 9/2003 | Tabe et al. ........................ 710/36 |
| 6,691,921 | B2 * | 2/2004 | Endo et al. .................... 235/492 |
| 6,715,085 | B2 * | 3/2004 | Foster et al. .................... 726/27 |

(Continued)

*Primary Examiner* — Carolyn B Kosowski
(74) *Attorney, Agent, or Firm* — Galgano & Associates, PLLC; Thomas M. Galgano; Jessica G. Bower

(57) ABSTRACT

An integrated circuit assembly having monitoring circuitry for observing the internal signals of the system so that its properties are captured. The system properties are manipulated so that they can be used as a pseudo random number and or as the basis number for an encryption key. The monitoring circuitry having: manipulation circuitry to transform monitored data and combine it with previously manipulated values; and registers to store previously manipulated values; and counters to count events; and condition detection circuitry for detecting when a signal is at a specific value or range of values. Optionally the monitoring circuitry which has the functionality for capturing system properties may be combined with other monitoring circuitry, which has the functionality required by a debug support circuit. The monitoring circuitry avoids replication of resources by sharing parts of specific monitoring circuits like counters.

9 Claims, 4 Drawing Sheets

U.S. PATENT DOCUMENTS

| | | | |
|---|---|---|---|
| 6,769,065 B2 * | 7/2004 | Mayer | 726/2 |
| 6,851,056 B2 * | 2/2005 | Evans et al. | 713/193 |
| 6,944,778 B2 * | 9/2005 | Walter et al. | 713/184 |
| 6,948,065 B2 * | 9/2005 | Grawrock | 713/168 |
| 7,005,733 B2 * | 2/2006 | Kommerling et al. | 257/679 |
| 7,073,059 B2 * | 7/2006 | Worely et al. | 713/168 |
| 7,227,951 B2 * | 6/2007 | Desai et al. | 380/46 |
| 7,231,476 B2 * | 6/2007 | Watt et al. | 710/200 |
| 7,248,069 B2 * | 7/2007 | Moyer et al. | 326/16 |
| 7,251,734 B2 * | 7/2007 | Blangy et al. | 713/189 |
| 7,260,643 B2 * | 8/2007 | Chi et al. | 709/238 |
| 7,266,848 B2 * | 9/2007 | Moyer et al. | 726/29 |
| 7,281,162 B2 * | 10/2007 | McDonald-Maier et al. | 714/30 |
| 7,305,534 B2 * | 12/2007 | Watt et al. | 711/163 |
| 7,334,131 B2 * | 2/2008 | Orlando et al. | 713/189 |
| 7,373,522 B2 * | 5/2008 | Leaming | 713/193 |
| 7,392,401 B2 * | 6/2008 | Kohara et al. | 713/193 |
| 7,428,645 B2 * | 9/2008 | O'Connor et al. | 713/300 |
| 7,487,367 B2 * | 2/2009 | Belnet et al. | 713/194 |
| 7,509,250 B2 * | 3/2009 | Cruzado et al. | 703/28 |
| 7,660,998 B2 * | 2/2010 | Walmsley | 713/189 |
| 7,664,953 B2 * | 2/2010 | Tateno et al. | 713/169 |
| 7,681,103 B2 * | 3/2010 | Devadas et al. | 714/752 |
| 7,685,438 B2 * | 3/2010 | Knudsen | 713/194 |
| 7,707,413 B2 * | 4/2010 | Lunt et al. | 713/168 |
| 7,761,714 B2 * | 7/2010 | Luzzi et al. | 713/182 |
| 7,804,956 B2 * | 9/2010 | Chang et al. | 380/44 |
| 7,827,413 B2 * | 11/2010 | Liardet et al. | 713/189 |
| 7,865,739 B2 * | 1/2011 | Lutnaes | 713/193 |
| 7,889,862 B2 * | 2/2011 | Dellow et al. | 380/44 |
| 7,900,064 B2 * | 3/2011 | Cruzado et al. | 713/194 |
| 7,929,549 B1 * | 4/2011 | Talbot | 370/395.7 |
| 7,953,989 B1 * | 5/2011 | Hsiang et al. | 713/194 |
| 7,954,162 B2 * | 5/2011 | Kori et al. | 726/26 |
| 7,961,885 B2 * | 6/2011 | Cruzado et al. | 380/277 |
| 7,978,095 B2 * | 7/2011 | McClure et al. | 340/870.02 |
| 8,011,005 B2 * | 8/2011 | Cruzado et al. | 726/16 |
| 8,090,108 B2 * | 1/2012 | Qureshi et al. | 380/281 |
| 8,112,643 B2 * | 2/2012 | O'Connor et al. | 713/300 |
| 2001/0037458 A1 * | 11/2001 | Kean | 713/193 |
| 2002/0029345 A1 * | 3/2002 | Kawasaki et al. | 713/190 |
| 2003/0204743 A1 * | 10/2003 | Devadas et al. | 713/200 |
| 2004/0114765 A1 * | 6/2004 | Liardet et al. | 380/277 |
| 2004/0128523 A1 * | 7/2004 | Fujioka | 713/189 |
| 2005/0261018 A1 * | 11/2005 | Yamamoto | 455/522 |
| 2005/0283693 A1 * | 12/2005 | Dixon et al. | 714/727 |
| 2006/0021044 A1 * | 1/2006 | Cook | 726/25 |
| 2006/0133607 A1 * | 6/2006 | Forehand et al. | 380/44 |
| 2007/0177433 A1 * | 8/2007 | Poirier | 365/189.05 |
| 2009/0296933 A1 * | 12/2009 | Akselrod et al. | 380/277 |
| 2009/0313473 A1 * | 12/2009 | Walker et al. | 713/175 |
| 2010/0017659 A1 * | 1/2010 | Dos Remedios | 714/36 |
| 2011/0148620 A1 * | 6/2011 | McClure et al. | 340/514 |

* cited by examiner

DEVICE TO GENERATE A MACHINE SPECIFIC IDENTIFICATION KEY

FIELD OF THE INVENTION

This invention relates generally to the generation of a unique identifying number from a system's properties, which may be employed for a variety of purposes such as system identification and generation of encryption keys.

BACKGROUND OF THE INVENTION

A system is a functionality related assembly of parts. This invention relates to a man made system. Such an assembly may include both organic and inorganic subassemblies and subsystems. Currently, most man made systems are assembled almost entirely from man made parts, such as electronic components; optical components; mechanical parts and or similar. Most of the behavioural complexity relating to today's systems is contained within integrated circuit assemblies, especially but not exclusively in the form of programmable circuits, such as microprocessors or state machines.

In some applications it is desirable to identify uniquely a system in order to distinguish it from other similar systems. One method of identifying biological systems, like humans, is to create a numeric value based on the system's uniquely distinguishing features (biometrics) such as a fingerprint or iris pattern. It is desirable to have a comparable form of identification for synthetic systems, (machines) and is known as an ICmetric. Like biometrics, ICmetrics can be derived from properties that change with time but have a core underlying feature which is deterministic and can be reliably extracted. Such properties are useful for identification purposes including signatures and other security applications like passports.

Although system properties can be stable, properties can also be unstable, non-deterministic and have no extractable core underlying feature. By deriving a unique value/key from a highly dynamic property, the key can be changed frequently, providing a high degree of confidence that a system or its communications have not been compromised by another, possibly malicious entity. A value derived in this way is ideal for security applications such as key generation for an asymmetric encryption system.

A conventional approach to generating unique values in a machine is a random number generating algorithm which may be realised as software or a hardware circuit. The problem with algorithms is that they are inherently deterministic unless based on samples of real world non-deterministic properties. A value derived from carefully chosen system properties can be naturally non-deterministic. The execution path through a program is changed greatly by the applied data as is the sequence of values that pass over the buses. This is further enhanced in high-performance computer architectures that incorporate circuits with pipelines and caches, which have highly non-deterministic effects. Even a small change on a position sensor can have an apparently chaotic impact on certain derived values.

Well designed integrated circuits normally include infrastructure circuits designed to help the developer debug and improve the system. Debug infrastructure can include monitoring circuitry such as; event detection trigger circuits, trace circuits and profiling circuitry which observe critical connections within circuits. Event detection circuits produce a stimulus for use by other circuits upon a signal meeting preset conditions. Trace circuits create a log that records the transitions of a chosen signal such as the data and address buses. Profiling circuitry contains counters that can record how many iterations of an action or event have occurred.

SUMMARY OF THE INVENTION

According to the invention, there is provided a device for generating a machine-specific identification key, the device comprising:

monitoring circuitry to monitor transmitted signals within one or more machine circuits and generate signal information based on said monitored signals;

a register in which the generated signal information is stored;

manipulation means to convert generated signal information into an identification key.

In this arrangement, monitoring circuitry is used to observe one or several signals that are known to change frequently. In some cases the monitoring circuitry will count events like the assertion of a signal, particularly but not limited to an instruction cache hit signal or data cache hit signal. In other cases the monitoring circuitry observes a signal and uses its value to modify a register. A non-exhaustive list of signals that could be monitored include: data address bus, data value bus, data control bus, instruction address, system timer, signals relating to a memory management unit, signals relating to a communication interface or any peripheral.

In the case where signals are used to modify a register, it can be via: simple combinational logic like a bitwise exclusive-or; a more complicated operation such as an arithmetic operation; a conventional pseudo random number generator; another implementation specific operation. The counters and registers can then be read via the memory map by a privileged part of the system such as, an operating system, security circuits, security routines or debug monitor routines. Alternatively the signals and or counter values are combined by a circuit to create a single value as required by the application.

Although it is practical to create dedicated monitoring circuitry to detect and extract system properties for use as a random number or unique identifier, there is already monitoring circuitry in most integrated circuits in the form of debug support circuitry. This existing debug circuitry may observe some or all of the chosen signals, especially the buses and cache performance signals like a hit signal. Therefore, combining all the monitoring circuitry together saves significant resources as no monitoring circuitry is replicated. System security is not compromised, because all monitoring circuits are only accessible by privileged parts of the system. In some cases it may be preferable to disable monitoring when certain locations in the memory map are accessed, such as the registers associated with the monitoring circuitry and security circuits. Disablement of the monitoring circuitry is controlled by dedicated event detection circuitry which may have one or several regions of operation. The detection circuitry may disable monitoring of one or more signals depending on the matched region and configuration.

The invention also provides a system for generating a single value from the observed values, comprising:

means for analysing a plurality of samples and obtaining observed circuit values for the samples, each sample being interpreted as a plurality of circuit values;

processing means for:

calculating the distributions of the of the circuit values from the plurality of samples in order to determine their component modal values and the means and variances associated with each modal value deriving a single code from a combination of the circuit values, wherein the single code comprises a sub-set of the bits derived from the combination of circuit values.

BRIEF DESCRIPTION OF THE DRAWINGS

Specific embodiments of the invention will now be described by way of example with reference to the accompanying drawings in which:—

DETAILED DESCRIPTION

An aspect of the invention provides an integrated circuit assembly with monitoring circuitry comprising: event counters for counting events; condition detection circuitry for detecting and generating event signals; manipulation circuitry to convert information from monitored signals; registers for storing monitored signals and manipulated signals.

Figure 1:
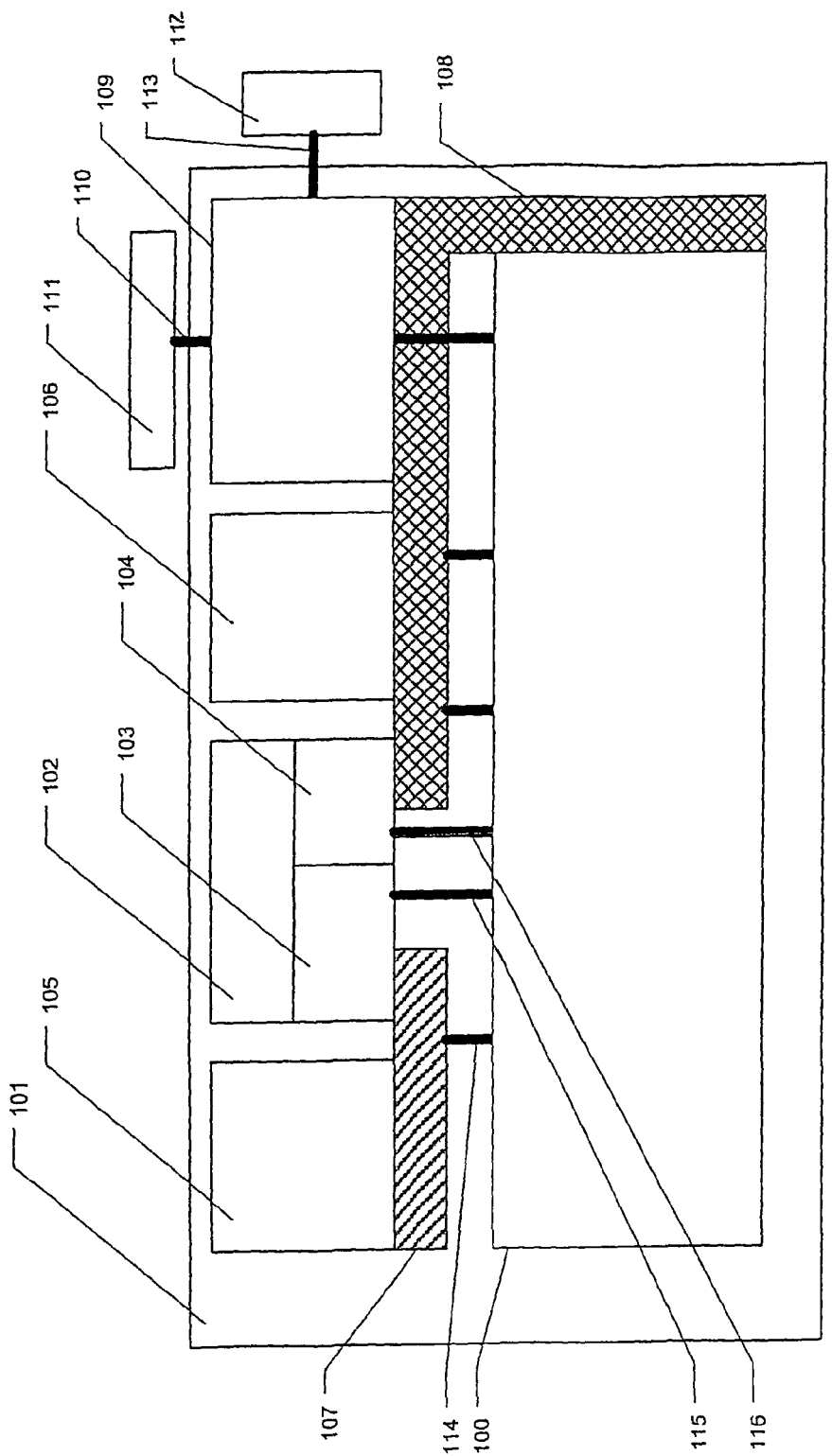
FIG. 1 illustrates an integrated circuit assembly with monitoring circuitry for observing the system.
Figure 2:
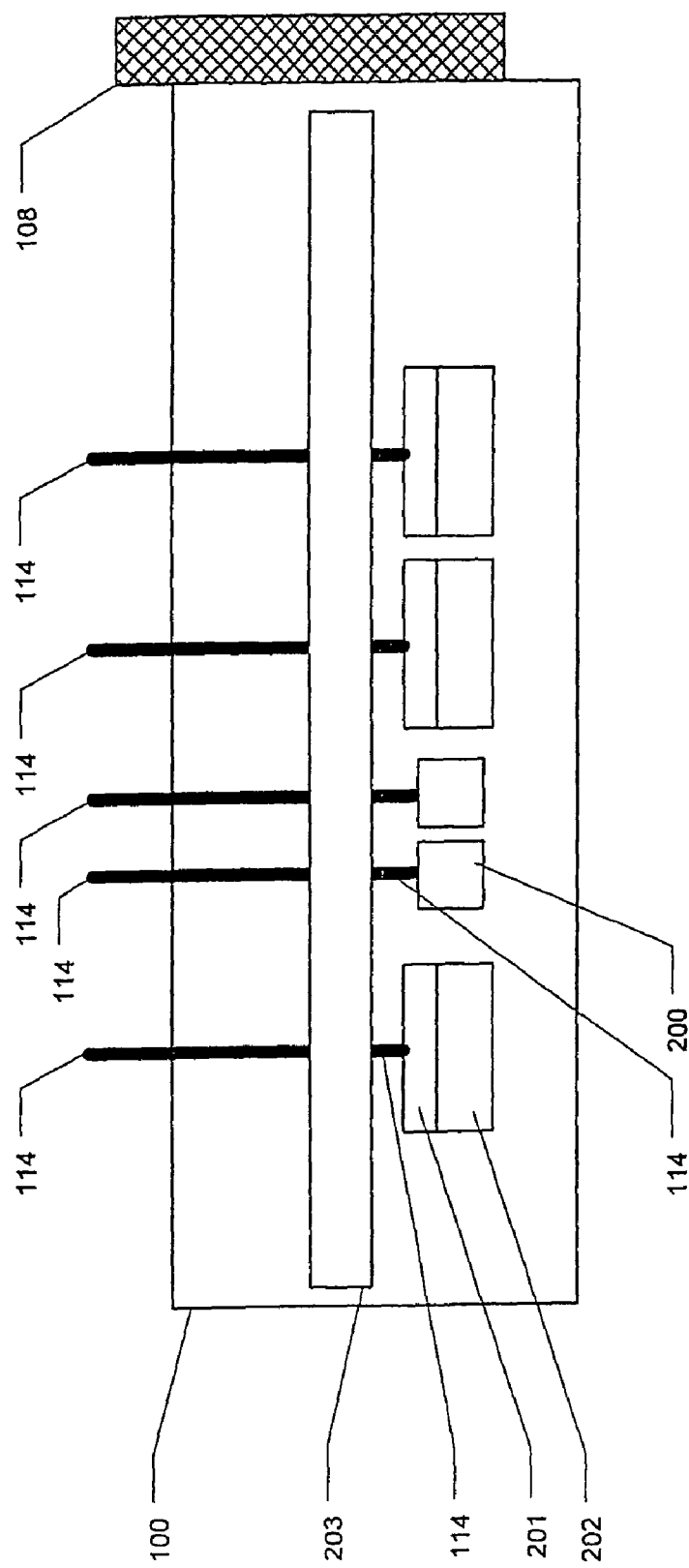
FIG. 2 illustrates a first more detailed example of the invention, in which the monitoring circuitry has counters and registers that make the system's properties accessible to other parts of the system.

FIG. 1 is a schematic diagram and is used to explain the invention in general terms, and FIG. 2 shows a first more detailed embodiment.

This invention relates generally to the generation of a unique identifying number from a system's properties, which may be employed for a variety of purposes such as system identification and generation of encryption keys.

Referring to the drawings, the monitoring circuitry (100) is part of an integrated circuit assembly (101) which includes the conventional parts of a microcontroller and or system on chip. For general explanatory purposes the assembly is simplified to a processor core (102) which is not restricted to a digital design, plus a selection of optional parts such as: instruction cache (103); data cache (104); instruction memory (105); data memory (106); instruction bus assembly (107); data bus assembly (108); peripherals (109); external communication paths (110) which connect to external communication circuitry (111); external signals (112) that connect to other external circuits like sensors (113); Internal signals (114) that interconnect the various sub-components within integrated circuit assembly (101). Specific examples of signals include an instruction cache hit signal (115) and a data cache hit signal (116) which provide status events to the monitoring circuitry (100).

A first embodiment has monitoring circuitry as shown in FIG. 2 comprising: counters (200) to count events monitored on internal signals (114) such as those connected to the instruction cache (103), data cache (104) or other circuit; manipulation circuitry (201) to transform monitored data and combine it with previously manipulated values stored in registers (202) or a memory; condition detection circuitry (203) for detecting when a signal is at a specific value or within/outside a range of values. Preferably but optionally, condition detection circuitry (203) disables the monitoring circuitry (100) from changing one or more stored values in the counters (200), registers (202) or memory, so that their value(s) are not corrupted when the system accesses the counters (200) and registers (202) using the data bus assembly (108) or other means necessary to manipulate the collected values to a more useful form, such as a more robust random number, a unique identifying value or an encryption key. Preferably but optionally, one of the monitored signals connects to the data value part of the data bus assembly, because the data bus carries a significant amount of traffic related to the system's operation, which when analysed allows its operation/behaviour to be characterised.

In the case where the desired outcome is a random number the manipulation circuitry (201) performs a bitwise exclusive-or, or other hash function value merging operation of the monitored signal and the contents of its associated register (202), such as the result is then stored back in the same register (202). In other cases such as when creating an identifier or encryption key the manipulation circuits may characterise the observed signals to create approximations to the statistical distributions of their values. One approach to characterisation is to record the occurrences of values within specific ranges, which can optionally be adjusted at run-time by manual experimentation or automatically using a calibration circuit. Other signals of specific monitoring interest are: the data address part of the data bus assembly; the instruction address part of the instruction bus assembly, an instruction hit signal (115) from the instruction cache (103) or a data hit signal (116) from the data cache (104).

The occurrences of values may be logged using one or several counters (200), whose value(s) may be selectively logged in either register (202) or a memory when one of the counters overflows. These logged values are used to determine the historical signal value distributions used by online profiling circuits within the manipulation circuitry (201). The invention allows similar status signals connected to other circuits. A further option allows the circuitry (100, 200, 201, 202) to be disabled to conserve power within the overall integrated circuit assembly (101).

Figure 3:
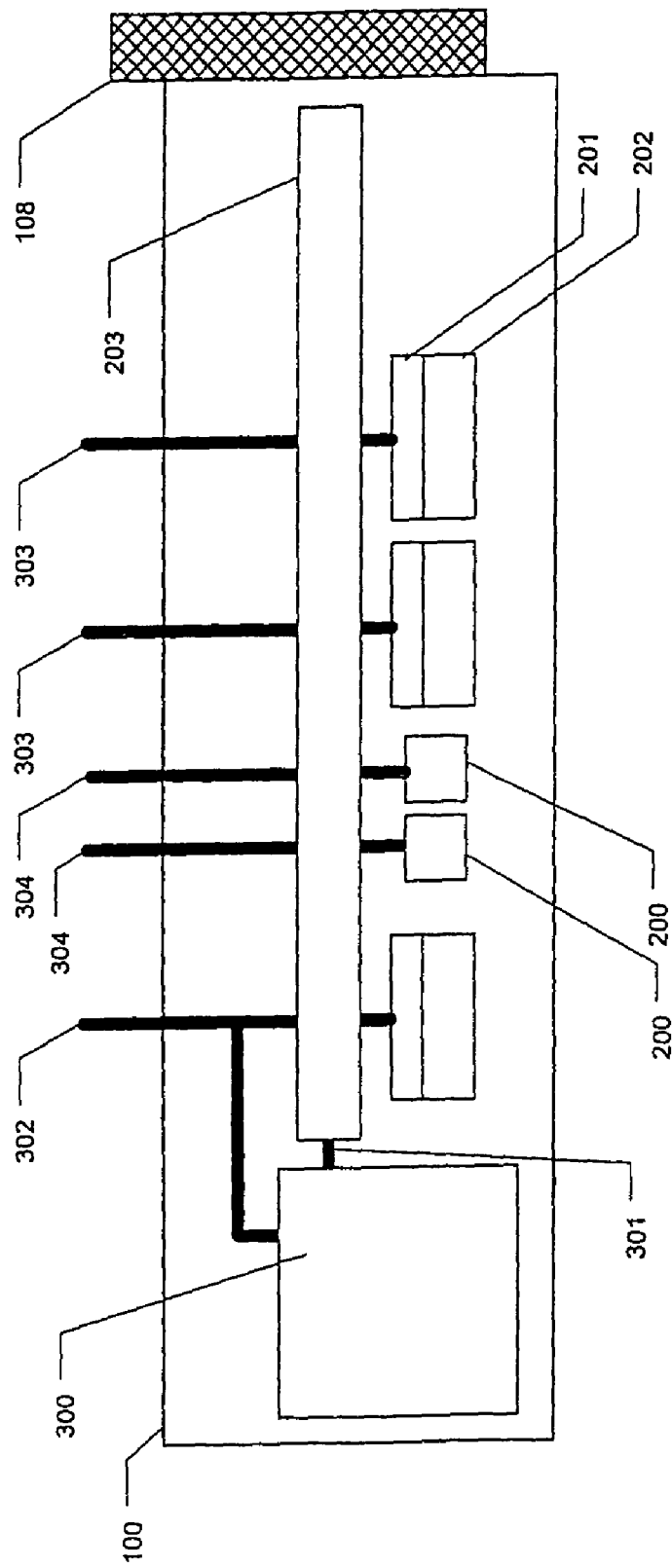
FIG. 3 illustrates a second more detailed example of the invention, in which the monitoring circuitry additionally to FIG. 2 contains debug support circuitry.

A second embodiment is an extension of the first embodiment as shown in FIG. 3, which additionally includes debug support circuitry (300) which monitors a plurality of signals that are also monitored by other parts of the monitoring circuitry (100) such as the condition detection circuitry (203) and manipulation circuitry (201). To avoid unnecessary replication of circuitry, parts of the debug support circuitry (300) are shared with other parts of the monitoring circuitry (100) using internal signals (301). Preferably but optionally, the monitoring circuitry (100) uses signals from debugging interfaces located within the integrated circuit assembly (101), specifically signals from: a processor to debug support interface (302); a data path to debug support interface (303); a cache memory to debug support interface (304). The counters (200) and registers (202) are made accessible by the debug support circuitry (300) and any external debugging tools. Specifically, the values held in the counters (200) that monitor the caches (103, 104) are made available for profiling purposes.

Figure 4:
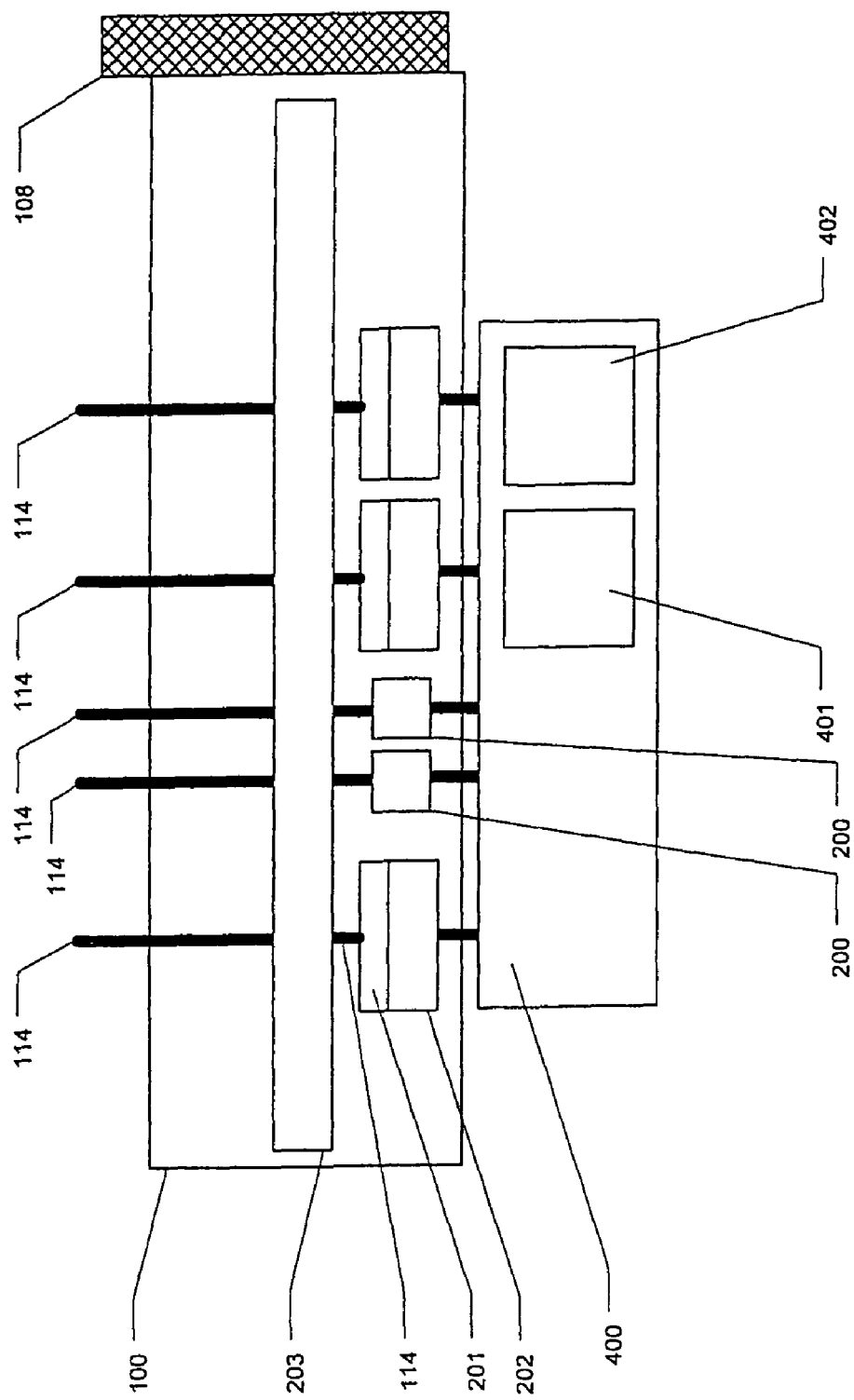
FIG. 4 illustrates a third more detailed example of the invention in which the monitoring circuitry additionally to FIG. 2 contains encryption circuitry.

A third embodiment shown in FIG. 4 is an extension of the first embodiment, which may optionally include the debug support circuitry (300) of the second embodiment. The third embodiment includes encryption related circuitry (400) comprising: key generation circuitry (401) which generates encryption keys based on the counters (200) and register values (202); and optionally encryption circuitry (402) that encrypts data within the integrated circuit assembly (101) for transmission outside the system, or transfer to another circuit within the system. This encryption circuitry implements an algorithm that is suitable for the chosen application, and may be based on: a symmetric algorithm such as the Data Encryption Standard (DES) or Advanced Encryption Standard (AES); an asymmetric algorithm such as RSA; or other similar.

Optionally the key generation circuitry (401) periodically generates new keys based on the value of a system timer (403); alternatively it can be requested to generate a new key by another part of the system.

A fourth embodiment utilises the historical signal values and their distributions gathered by the online profiling circuits contained within the manipulation circuitry (201) to determine if the system's properties and or features have changed due to unauthorised tampering or failure of one or more parts of the system. In the case of severe changes due to tampering or a failure within the system, the monitored signals will be outside their normal ranges, thus causing the properties and features to deviate significantly. Therefore it is made possible to identify that tampering or failure has occurred. By analyzing the application specific set of monitored signals and the changes it is also possible to identify between failure and potentially malicious tampering.

A fifth embodiment includes a combination of the extensions made to the first embodiment by the second and third embodiments.

The code generation process uses an algorithm which includes statistical data about the general population of circuits to be analysed, and this is obtained in a calibration stage (carried out once) before the circuit data is analysed in the subsequent data analysis stage. [w1]

Calibration Phase

Prior to operation, a decision is made as to the task on which the system will operate and the precise feature set, in the form of circuit features, to be used for the chosen modality. This phase will need to be repeated for each modality, feature set and for each configuration of the monitoring circuitry to be employed. The latter condition is due to configuration specific properties which may influence system operation.

When obtaining the circuit samples to calibrate the system, the precise number of samples for each circuit is dependent on the modality under consideration due to differences in their stability although the more samples, the better the resulting system performance.

The sample obtained in the calibration phase are used to determine the time-stability of the data obtained. Time-stability is judged according to specified criteria included in the circuitry. Stability can be assessed on the entire bit sequence of the signal. Alternatively, a portion of the bit sequence may be tested and subsequently processed. For example, higher order buts of a signal may be used where such bits change less over time (for example a counter).

The measured values require normalisation which involves generating mapping vectors, as described further below, and the de-correlation operation is also detailed below in the description of the data analysis stage.

Feature Normalisation

The features employed in an analysis system may take on a diverse range of forms depending of the nature of the circuits to be analysed. The values and value ranges of features are hence primarily governed by the characteristics of the features themselves and therefore, necessarily, the absolute value of features alone possesses little semantic value when considered in relation to other features (the value "3" in absolute terms, possesses little meaning as two features with the value "3" may not in any way be considered equal).

Since the underlying purpose is to combine feature values to form a single code, it is necessary to normalise feature values onto a given linear scale in order that their absolute value has some comparable meaning. The effect of this process will be to render each feature as equally significant. A significant property of the system of the invention is that weighting (in the sense of allocation of importance to feature values) is handled implicitly within the feature combination phase of the algorithm as will be apparent below.

A further significant property of the invention is its ability to handle features which may occur in multi-modal clusters where the component values for a given circuit may occur within given subsets of the given feature range. Two distinct subgroups of feature values may be identified, features where the component values are independent of any circuit and features where the values associated with a given circuit, form clusters of values which are numerically close to each other. In order to encapsulate all the possibilities, the actual normalization process defines a mapping from the actual measured values for each feature onto an alternative scale which clusters all values associated with a given circuit together. The alternative techniques for achieving this are outlined below.

Independent Features

The algorithm for dealing with this situation operates as follows:—

1. A virtual modal value is defined for each of the circuits in a simplistic form. For example, for four circuits, the values within the range may be quartered and assigned to each circuit respectively
2. Repeat for each sample circuit n
   The real modal value for Circuit n is mapped to the virtual modal value for Circuit n.
   In order of descending frequency, for each subsequent value for Circuit n, the value is mapped to the next available discreet value above the virtual mode.

A remaining problem relates to values within the feature domain which are not found within the sample set used for deriving the normalisation maps. These are associated with the nearest defined value and mapped as is a member value for the given circuit. This may not be correct however and the only way to minimise error in such cases is to employ as large a training set as is possible.

Multi-Modal Features

The solution proposed for features possessing multi-modal distributions is to bring together the component modal values for each feature to a common base. The algorithm is as follows:—

1. Identify the local clusters by associating together sets of numerically adjacent values which are all addressed by values derived from the same sample circuit. Each cluster is then approximated by a Gaussian Distributions.
2. For each of the sample circuits, a virtual modal value is defined in a simplistic form. This procedure is guided by the need to map values throughout the feature space and to allow for previously unseen circuits to be assigned values within the system (otherwise a simple classification to one of the known circuits could be made).
3. Repeat for each component mode value for circuit n
   The local modal value for Circuit n is mapped to the virtual modal value for Circuit n.
   In order of descending frequency, for each subsequent value for Circuit n, the value is alternated below and above the virtual mode.
4. A division point is selected between the sample circuits present within the distributions. Any feature value less than the division point is assigned to the first quantization interval while any value greater than the division point is assigned to the second quantization interval.

For efficient employment of the system, the operation of the sample calibration circuits should be typical of, although significantly not identical to, the operation of the circuits on which the system is to be employed.

For each measured feature, the normalisation phase gives rise to a mapping from the measured values onto an alternative scale. This mapping is made available to the subsequent data analysis phase which represents the operational mode of the system.

Data Analysis Phase

For an unknown circuit, the monitoring circuitry is employed to derive the feature values for code generation as described above. The normalization mappings derived during the calibration phase are subsequently employed to map these measured values onto new values employed in the feature combination phase.

The goal of the feature combination phase is to generate circuit specific identifying numbers (termed basis numbers) with low intra-sample variance (that is, the values produced for the same circuit) but high inter-sample variance, (that is, the values produced for different circuits) with the ideal case being no inter-sample overlap of potential basis numbers.

The effectiveness of the combination strategy depends on the stability of the basis numbers generated. To achieve stability in the basis numbers, stable bits are chosen from the monitored signals in the calibration phase. Due to the fact that, for any given circuit, a subset of the features the basis numbers generated will deviate from their ideal values, the following properties will be typically observed for a simple addition of the values:—
- The low order bits will vary widely since these will be governed by any feature values which have not measured within the ideal interval.
- The higher order bits will in contrast tend to be stable for a given circuit (intra-sample) but significantly dissimilar for differing circuits (inter-sample). These stable bits, regardless of position, are employed to form the required basis number as they have low intra-sample variance but high inter-sample variance. The basis number generated may subsequently be employed to generate encryption keys or as a pseudo-random number. The precise demarcation line between the unstable and stable bits will be specific to the application, feature set and monitoring circuit configuration employed and must be determined empirically during the calibration phase, which will rank the stability of signals' bits in a list as part of its operation.

The invention claimed is:

1. A device for generating a machine-specific identification key, the device comprising:
   a machine having a machine circuit comprising debug circuitry and at least one other machine circuit for transmitting signals, said machine having sub components;
   monitoring circuitry incorporated in said debug circuitry, for monitoring said transmitted signals and for generating signal information based on said monitored signals;
   a register in which said generated signal information is stored; and
   means for converting said generated signal information into a machine-specific identification key;
   whereby said monitoring circuitry incorporated in said debug circuitry monitors transmitted signals within said at least one other machine circuit and generates said signal information to be converted into said machine-specific identification key by said means for converting said generated signal information into a machine specific identification key; and
   wherein said monitoring circuitry of said debug circuitry is re-used to monitor digital logic signal values present in said sub components of said machine.

2. A device according to claim 1, further comprising:
   key generation circuitry which uses time-stable portions of said generated signal information to generate said machine-specific identification key.

3. A device according to claim 2, wherein:
   said key generation circuitry includes a system timer; and wherein said key generation circuitry periodically generates new machine-specific identification keys based on a value of said system timer.

4. A device according to claim 3, further comprising:
   encryption related circuitry which generates an encryption key based on a resulting value of said register.

5. A device according to claim 1, wherein:
   said monitoring circuitry includes condition detection circuitry, said condition detection circuitry preventing said monitoring circuitry from changing said signal information stored in said register.

6. A device according to claim 1, further comprising:
   a data bus assembly, wherein said monitoring circuitry monitors said data bus assembly.

7. A device according to claim 1, wherein said means for converting said generated signal information performs a hash operation on said generated signal information stored in said register.

8. A device according to claim 7, wherein said hash operation is a bitwise exclusive-or operation.

9. A device according to claim 1, further comprising:
   means for determining a change in a monitored value.

* * * * *